United States Patent
Fernando et al.

(10) Patent No.: US 8,274,414 B2
(45) Date of Patent: Sep. 25, 2012

(54) SIGNAL AMPLITUDE ADJUSTMENT TO IMPROVE RESOLVER-TO-DIGITAL CONVERTER PERFORMANCE

(75) Inventors: Lalinda D. Fernando, Burlington, MA (US); Michael C. W. Coln, Lexington, MA (US)

(73) Assignee: Analog Devices, Inc., Norwood, MA (US)

( * ) Notice: Subject to any disclaimer, the term of this patent is extended or adjusted under 35 U.S.C. 154(b) by 386 days.

(21) Appl. No.: 12/635,213

(22) Filed: Dec. 10, 2009

(65) Prior Publication Data
US 2011/0140689 A1    Jun. 16, 2011

(51) Int. Cl.
*H03M 1/48* (2006.01)

(52) U.S. Cl. .......................................... 341/116; 341/112

(58) Field of Classification Search ................... 341/112, 341/116; 324/76.11, 76.52, 76.77
See application file for complete search history.

(56) References Cited

U.S. PATENT DOCUMENTS

| | | | |
|---|---|---|---|
| 5,510,850 A * | 4/1996 | Ueda et al. .................... | 348/649 |
| 6,278,388 B1 * | 8/2001 | Kushihara .................... | 341/112 |
| 6,426,712 B1 | 7/2002 | Hare et al. | |
| 6,510,282 B1 * | 1/2003 | Ruck et al. ........................ | 396/8 |
| 2002/0173931 A1 * | 11/2002 | Dudler et al. ................. | 702/151 |

OTHER PUBLICATIONS

"Variable Resolutin, 10-Bit to 16-Bit R/D Converter with Reference Oscillator", Analog Devices, 2008, pp. 1-36.
"12-Bit R/D Converter with Reference Oscillator", Analog Devices, 2003, pp. 1-24.

* cited by examiner

*Primary Examiner* — Jean B Jeanglaude
(74) *Attorney, Agent, or Firm* — Kenyon & Kenyon LLP

(57) ABSTRACT

An interface system between an RDC and a connected resolver dynamically matches an input range of the RDC to the output range of the resolver's output signals. The interface system may include methods and/or apparatuses to determine the amplitude of sinusoidal input signals presented to the RDC by the resolver and to compare the amplitude against high and low threshold values. A gain control signal may be generated, which may be corrected if the detected amplitude either exceeds the high threshold or falls below the low threshold. The gain control signal may be output to a circuit in the RDC or in the resolver that corrects any mismatch that occurs between the RDC input and the resolver output. For example, the gain control signal may control the amplitude of an excitation signal applied to a primary of the resolver or the gain control signal may be applied to an analog to digital converter at the input of the RDC to control its effective input range.

32 Claims, 6 Drawing Sheets

200

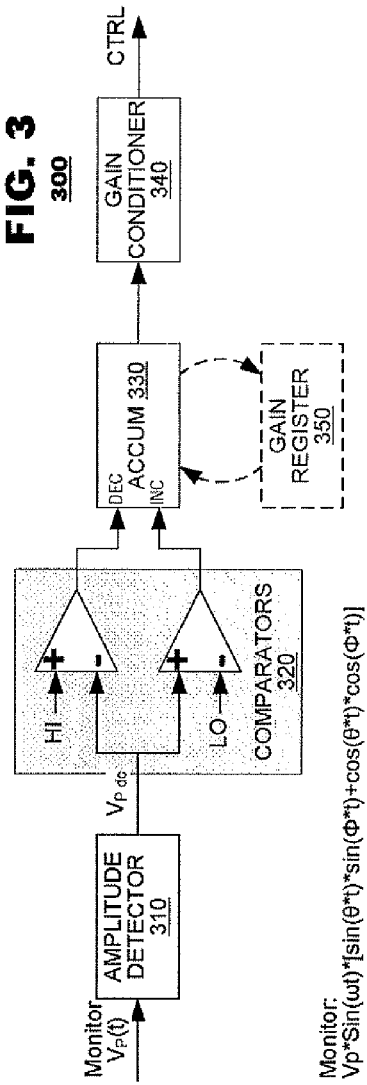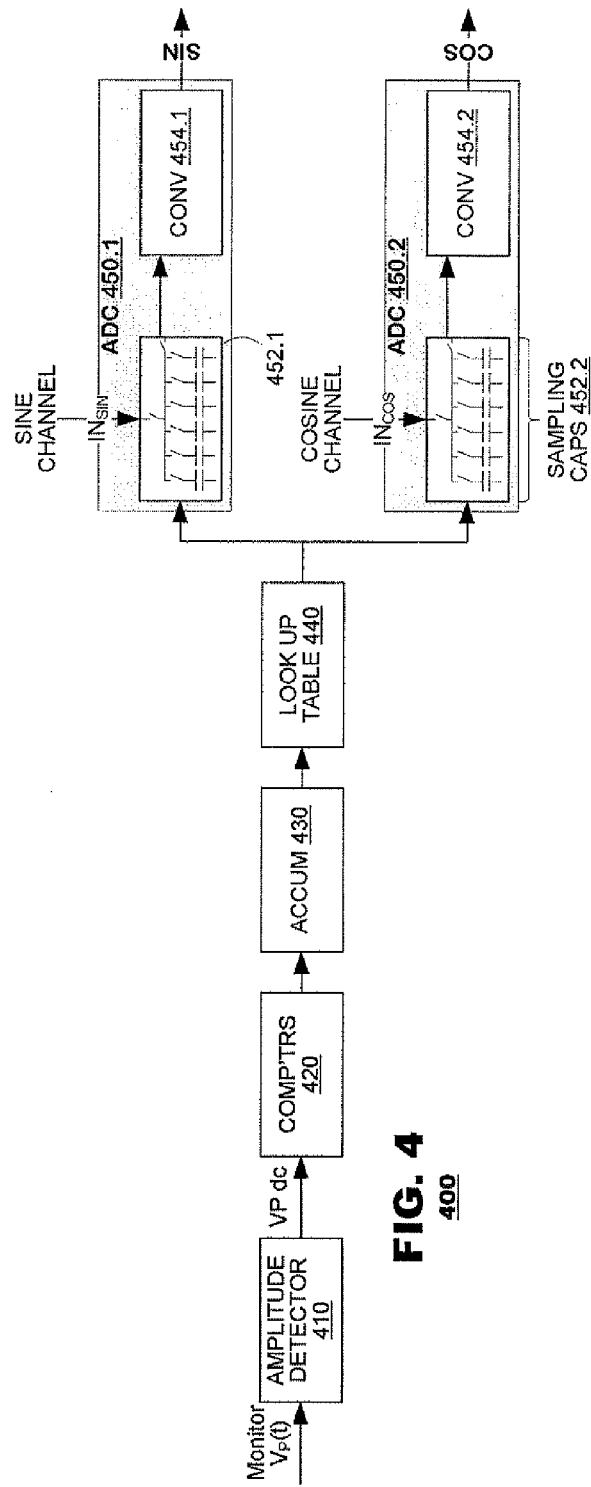

500

600

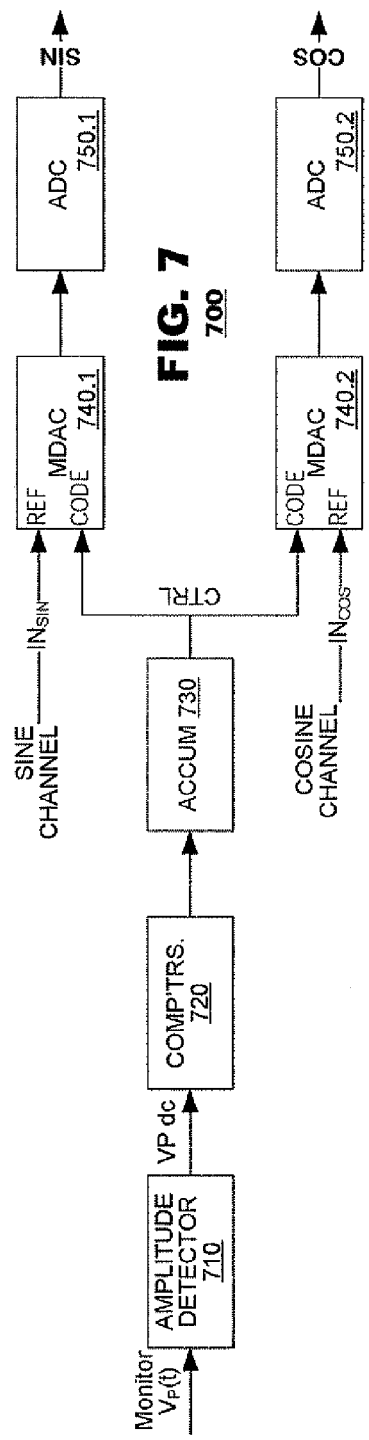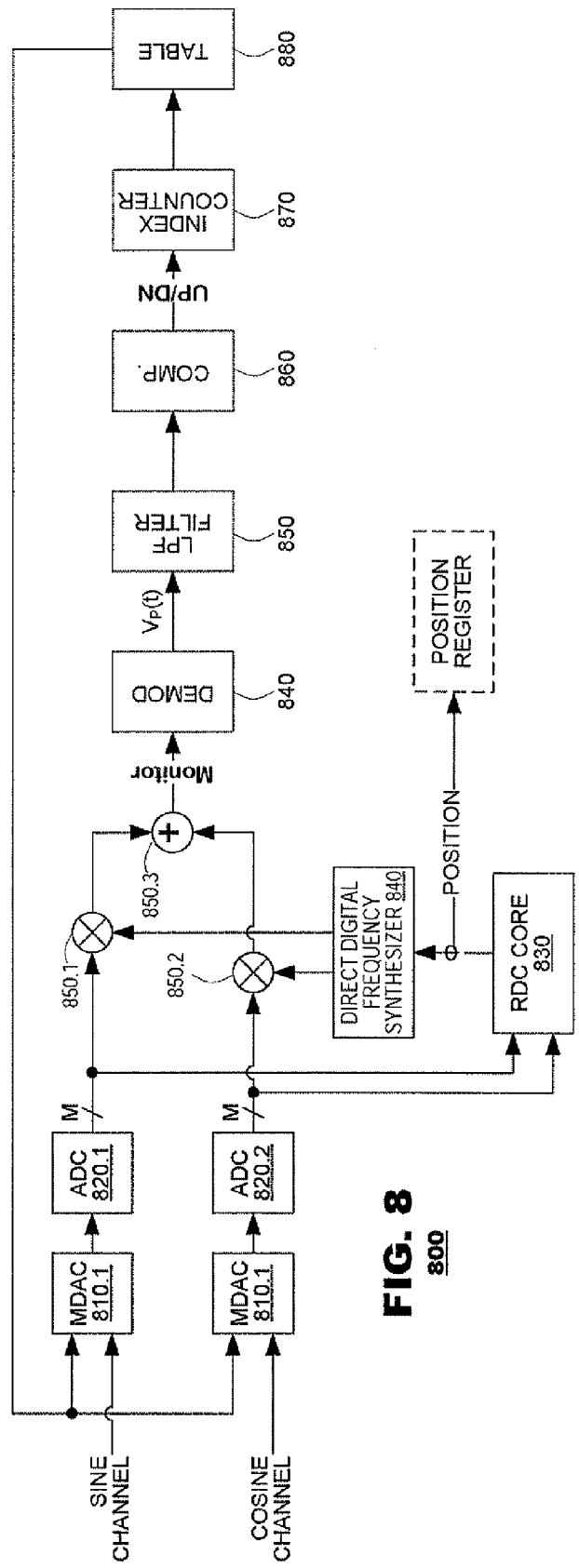

900

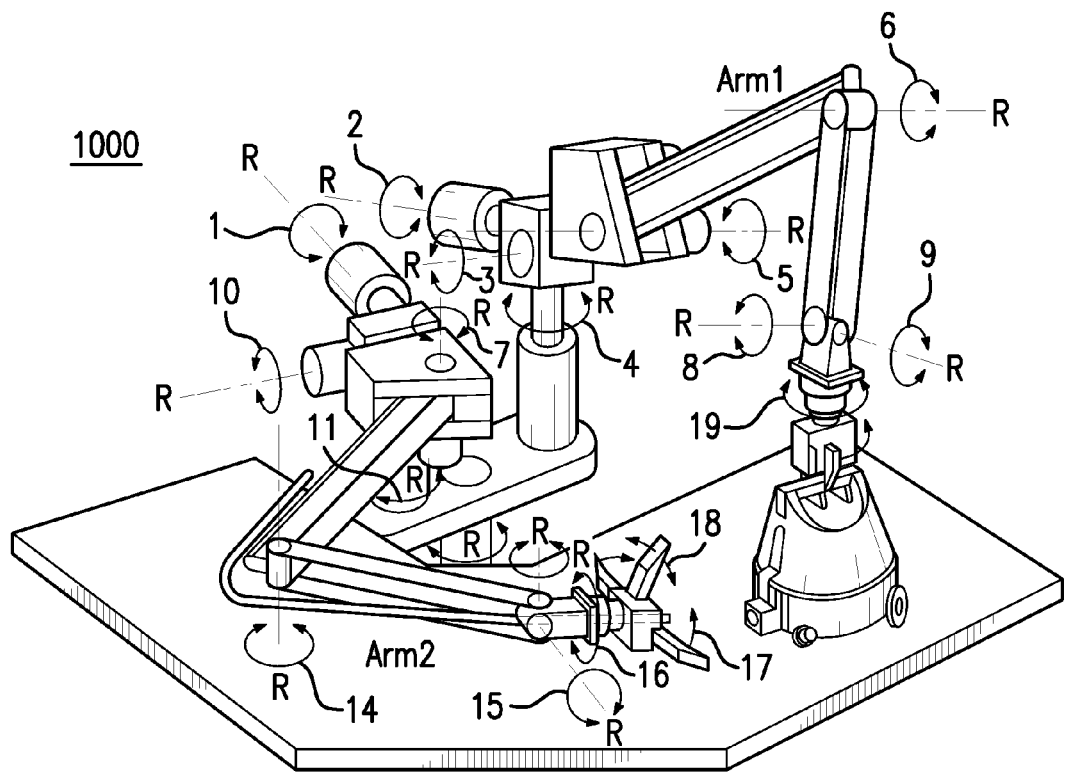
FIG.10
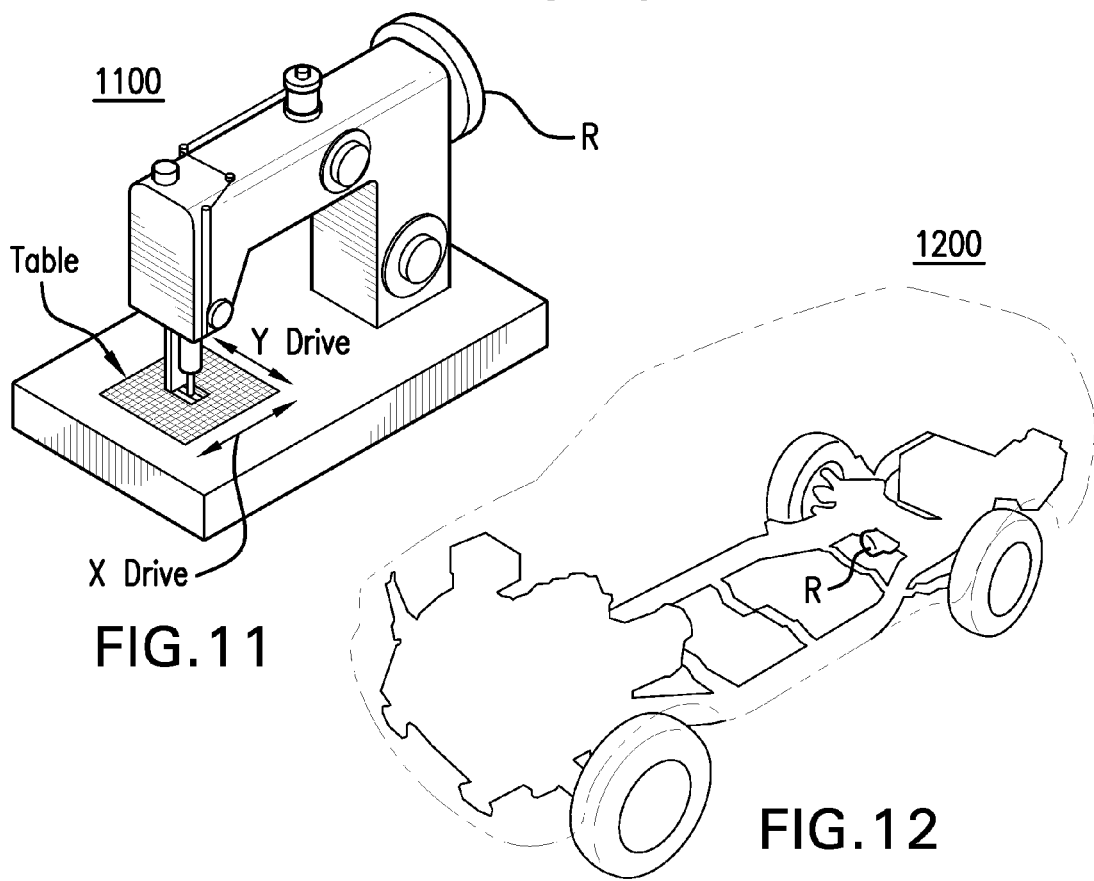
FIG.11
FIG.12

SIGNAL AMPLITUDE ADJUSTMENT TO IMPROVE RESOLVER-TO-DIGITAL CONVERTER PERFORMANCE

BACKGROUND

A resolver is a rotary transformer used to measure position of a rotating shaft that is mechanically connected to the rotor. A resolver typically includes three magnetically coupled inductors, as shown in FIGS. 1 (*a*) and 1 (*b*). A first winding, called the "primary", may be mounted either in the rotor (FIG. 1 (*a*)) or on the stator (FIG. 1 (*b*)). The primary is excited by a sinusoidal voltage signal having the form EXC=Vexc*sin (ωt). A pair of secondary windings is mounted on the stator, magnetically orthogonal to each other. Due to electromagnetic coupling between the primary winding and each of the secondary windings, voltages are induced in the secondary windings having the form Vp*sin(ωt)*sin(θt) and Vp*sin(ωt)*cos(θt) respectively, where θ represents the angular orientation of the rotor and Vp is proportional to Vexc. For this reason, the secondary windings are called the sine channel and cosine channel respectively.

In the case of a variable reluctance resolver (FIG. 1 (*b*)), an element in the rotor provides the electromagnetic coupling between primary and secondary windings which in turn facilitates both the primary and secondary windings to be located on the stator. Therefore, there are no windings on the rotor as shown in FIG. 1 (*b*).

A Resolver-to-Digital converter (RDC) is an integrated circuit that measures the analog signals output from the sine and cosine channels of a resolver and generates a digital output code representing the rotor's angular position (θ). Conventionally, the RDC chips are designed to accept a predetermined limited range of voltages for the sine and cosine channel signals received from the resolver. Although the RDC chips are designed to a predetermined range of input voltages, the chips often are coupled to a variety of makes and models of resolvers, which do not always match the RDC's input range. Accordingly, purchasers of mismatched RDC chips and resolvers often must design interface circuits to match the resolver outputs to the RDC inputs. Designing such interface circuits not only can increase the total cost of ownership (TCO) of such resolver systems but it also can induce signal distortions or signal processing delays which can induce errors in the calculated value of θ.

Accordingly, there is a need in the art for an interface system between RDCs and resolvers that dynamically match the input range of the RDC to the output range of a resolver connected to the RDC. Further, there is a need in the art for such an interface system that performs dynamic matching without inducing distortions or propagation delays in the sine or cosine channels output from the resolver.

BRIEF DESCRIPTION OF THE DRAWINGS

FIG. 3 is a functional block diagram of a gain control system for an RDC according to an embodiment of the present invention.

FIG. 4 illustrates application of a gain control system according to an embodiment of the present invention.

FIG. 7 illustrates application of a gain control system according to a further embodiment of the present invention.

FIG. 8 illustrates an RDC processing system with integrated gain control according to an embodiment of the present invention.

FIGS. 10-12 illustrate resolver applications in which the RDC architectures of the foregoing embodiments may be employed.

DETAILED DESCRIPTION

Embodiments of the present invention provide an interface system between an RDC and a connected resolver to dynamically match the input range of the RDC to the output range of the resolver's output signals. The interface system may include methods and/or apparatus to determine the amplitude of sinusoidal input signals presented to the RDC and to compare the amplitude against high and low threshold values. A gain control signal may be generated, which may be corrected if the detected amplitude either exceeds the high threshold or falls below the low threshold. The gain control signal may be output to a circuit in the RDC or in the associated circuitry that corrects any mismatch that occurs between the RDC input and the resolver output. For example, the gain control signal may control the amplitude of an excitation signal applied to a primary of the resolver or the gain control signal may be applied to an analog to digital converter (ADC) at the input of the RDC to control its effective input range. Further, the gain control signal can be applied to digital multipliers that receive outputs of ADCs on the RDC input paths. Generation of the gain control signal may be performed automatically by an RDC, which may avoid the need for complicated interface circuits in resolver systems and lower the TCO for such systems.

Figure 1:
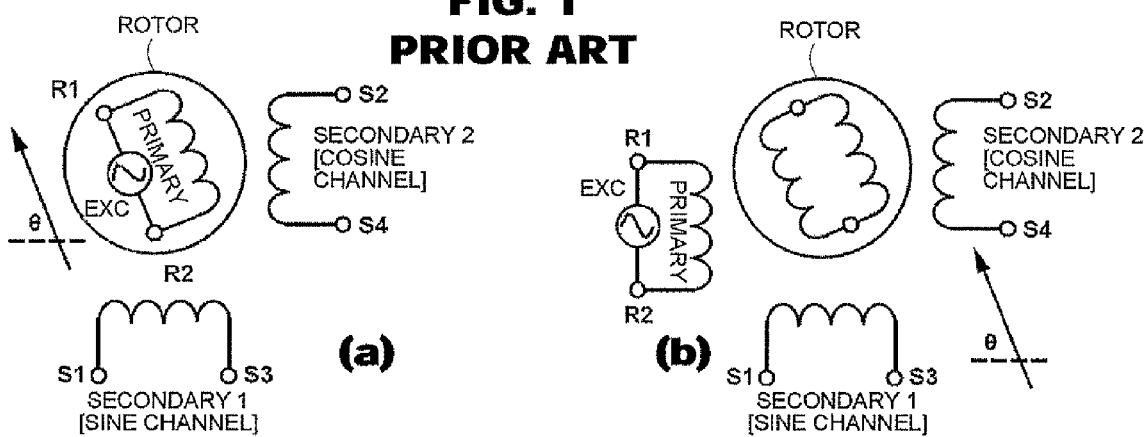
FIGS. 1 (*a*) and 1 (*b*) illustrate conventional resolver designs.
Figure 2:
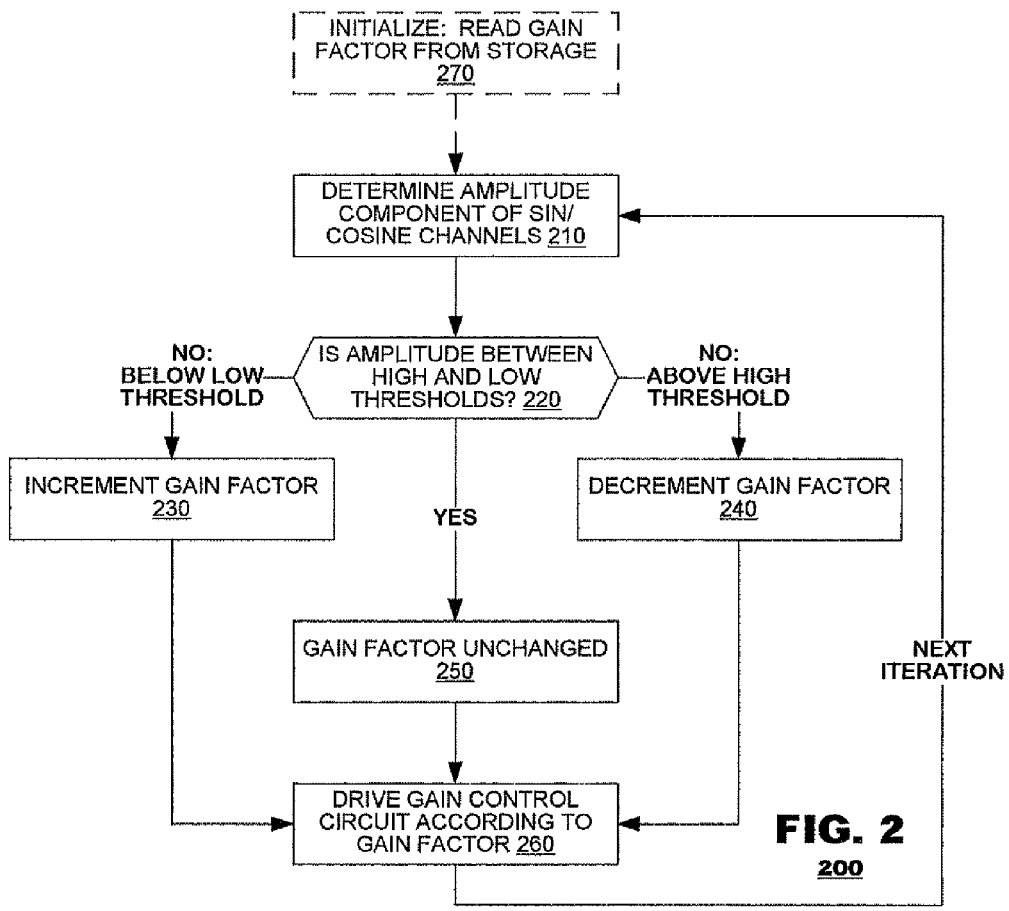
FIG. 2 illustrates an exemplary method according to an embodiment of the present invention.

FIG. 2 illustrates a method 200 for dynamically matching the input range of an RDC to output signals of a resolver, according to an embodiment of the present invention. The method 200 may begin by determining an amplitude component of the sine and cosine channels (step 210). Thereafter, the method 200 may compare the amplitude to predetermined high and low thresholds (step 220). If the amplitude is below the low threshold, the method 200 may increment a currently applied gain factor (step 230). If the amplitude is greater than the high threshold, the method 200 may decrement the currently applied gain factor (step 240). If the amplitude is between the high and low thresholds, the currently applied gain factor need not be changed (step 250). Thereafter, method 200 may generate an output gain control signal according to the gain factor, which may be applied to a circuit component that regulates the dynamic range of the resolver output signals or the effective input range of the RDC.

The method 200 may be engaged during initialization of an RDC circuit, for example, when the circuit is first powered up or restarted. During such time, the RDC circuit may have not have prior knowledge of the operational state of the resolver. In an embodiment, prior to restart or power down of the RDC circuit, the circuit may store a gain factor setting that was then in use. If a gain factor is available in storage, it may be read from memory prior to initiation of the method, step 210 (step 270). The initial gain factor setting also may be initialized or programmed to a predetermined setting by the user or RDC manufacturer, thereby guaranteeing the availability of an initial gain condition upon system power up or reset.

It is expected that, when an RDC is powered up or restarted, the RDC will converge to a gain factor setting that will remain generally persistent throughout operation of the RDC. However, signal ranges present on the sine/cosine channels may drift over time due to temperature variations or other operational effects. Accordingly, it may be beneficial to operate the method of FIG. 2 continuously or periodically during operation of the RDC.

FIG. 3 is a diagram illustrating functional blocks of a gain control system 300 according to an embodiment of the present invention. The gain controller system 300 may be integrated into digital processing logic of an RDC chip and, therefore, the system 300 may be embodied as a plurality of discrete processing circuits within the RDC or may be embodied as a control algorithm performed by a processing element of the RDC.

During operation of the RDC, it is expected that the sine and cosine channels will be digitized by a processing chain that includes an ADC. Thus, the sine and cosine signals may be represented as digital signal samples. During operation of the RDC, the sine and cosine channel may be mixed digitally with reference sinusoidal signals to generate a monitor signal having the form:

$$Vp*Sin(\omega t)*[sin(\theta t)*sin(\Phi t)+cos(\theta t)*cos(\Phi t)] \quad \text{Eq. (1.)}$$

when $\theta=\Phi$, however, the monitor signal reduces to:

$$Vp*Sin(\omega t)*[sin\ 2(\theta t)+cos\ 2(\theta t)], \text{ or} \quad \text{Eq. (2.)}$$

$$Vp*Sin(\omega t). \quad \text{Eq. (3.)}$$

Further description of the monitor signal and techniques for its generation may be found in the co-owned U.S. Pat. No. 6,426,712, which is incorporated by reference.

A gain control system 300 according to an embodiment of the present invention may include an amplitude detector 310, a pair of comparators 320, an accumulator 330 and, optionally, a gain conditioning circuit 340. The amplitude detector 310 may detect an amplitude of the monitor signal and may generate an output signal ($V_{p\_DC}$) representing this amplitude. The amplitude detector 310 may be implemented as a demodulator and a low pass filter to derive the amplitude. The comparators 320 each may compare the detected amplitude $V_{p\_DC}$ to respective high and low threshold values. The accumulator 330 may maintain a gain value on a running basis as determined by outputs from the comparators 320. For example, if the comparators 320 indicate that $V_{p\_DC}$ exceeds the high threshold, the accumulator 330 may decrement the gain value. If the comparators 320 indicate that $V_{p\_DC}$ is less than the low threshold, the accumulator 330 may increment the gain value. If the comparators indicate that $V_{p\_DC}$ is between the high and low thresholds, the accumulator 330 may maintain the gain value unchanged. The accumulator 330 may be provided as a counter with control logic coupled to the comparator output signals to increment, decrement or maintain the count values in this manner.

In an embodiment, the gain conditioning circuit 340 may output a control signal CTRL based on the gain value stored in the accumulator 330. In some embodiments requiring a linear control signal to be generated from the gain value circuit, the gain conditioning circuit 340 may be omitted. In other embodiments where it is desirable to generate a non-linear control signal, the gain conditioning circuit 340 may be provided to map the gain values to desirable CTRL signal values.

Optionally, the gain control system 300 may include a register 350 and associated control logic (not shown) to store the gain value at predetermined times during operation of the gain control system 300, for example, at periodic intervals or immediately prior to power down or reset of the RDC circuit. In such an embodiment, during restart or power up of the RDC, the control logic may read the gain value from register 350 to the accumulator 330.

The gain control system may be applied to various components to match the output signals of a resolver to the input systems of an RDC. FIGS. 4-7 illustrate several different embodiments.

FIG. 4 illustrates an embodiment in which a gain control signal may be applied to processing systems at an input of an RDC. FIG. 4 illustrates the amplitude detector 410, comparators 420 and accumulator 430 as discussed above with respect to FIG. 3. In this embodiment, the gain conditioning circuit may be provided as a look up table 440. The output of the accumulator 430 may be applied to the look up table 440 as an index, which access a storage location in the table from which a gain control signal CTRL may be read. The CTRL signal may be applied to select the sampling capacitors of ADCs 450.1, 450.2 that digitize the sine and cosine channels.

Many common ADC circuits, such as successive approximation register (SAR) ADCs and sigma-delta ADCs, may employ an array of binary weighted sampling capacitors 452.1, 452.2 to acquire an input signal prior to conversion. In a SAR conversion, represented schematically as converters 454.1, 454.2, typically involves a bit-by-bit trial of each position in an output digital code, to compare the sampled input signal to candidate reference voltages.

For an N bit ADC, a sampling capacitor array would have N−1 capacitors having capacitance values of C, 2*C, 4*C, ..., $2^{N-1}$*C (where C represents a smallest capacitor in the array). During sampling, all capacitors in the sampling array would be connected to an input signal and would charge under the influence of the input signal. During conversion, the accumulated charge would be compared with reference charges of a second capacitor array to perform the bit trials. In this regard, the structure and operation of such ADCs is well known.

According to an embodiment of the present invention, to provide effective scaling between an input channel and an RDC, operation of the sampling array may be modified during sampling of the input signals. For example, fewer than all of the sampling capacitors may be connected to the respective input channel. Under such operation, the capacitor arrays 452.1, 452.2 would capture a relatively lower amount of charge than would be captured if all the capacitors in the sampling arrays 452.1, 452.2 were coupled to the input channel. Due to the binary weighting of the sampling arrays, the effective capacitance $C_{EFF}$ of the sampling arrays 452.1, 452.2 may be controlled to any value between C and (2N−1)*C. Such operation effectively scales the input voltage acquired by a factor corresponding to $$\frac{C_{EFF}}{(2^n-1)*C}.$$

In this embodiment, each of the N−1 capacitors of the sampling arrays 452.1, 452.2 may be connected to their respective inputs via corresponding switches. The gain control signal CTRL from the look up table 440 may be an N−1 bit width signal, which may be applied directly to the capacitor switches to control the respective switches' coupling to the input terminal. The look up table 440, therefore may store switch patterns for each gain value of interest to be stored by the accumulator 430, to control the effective capacitance of the sampling arrays 452.1, 452.2 and scale the input signals present on the sine and cosine channels.

In a sigma-delta ADC architecture, a similar input sampling capacitor array may be used to perform the input signal scaling function.

Figure 5:
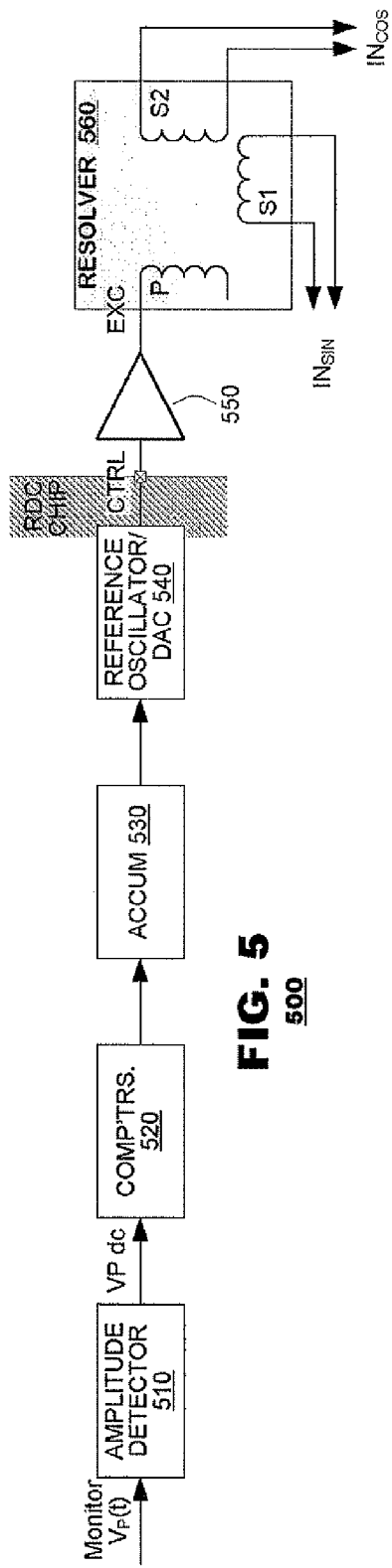
FIG. 5 illustrates application of a gain control system according to another embodiment of the present invention.

FIG. 5 illustrates an application of the gain control signal according to another embodiment of the present invention. In this embodiment, the gain control signal CTRL may provide gain control for an excitation signal to be applied to the primary winding P of the resolver. FIG. 5 illustrates the amplitude detector 510, comparators 520 and accumulator 530 of prior embodiments. In the embodiment of FIG. 5, the gain control signal may be applied to a reference oscillator/digital to analog converter (DAC) circuit 540 provided within the RDC chip. The oscillator/DAC circuit 540 typically outputs an oscillating excitation signal EXC from the RDC to the resolver 560 via coupling amplifier(s) 550. In an embodiment, the gain control signal may be applied to the oscillator DAC circuitry 540 (or alternatively, to the amplifier 550) to control the amplitude of the driving signal applied to the primary of the resolver 560. By controlling the amplitude of the excitation signal applied to the primary, the gain control circuit 500 also may control the amplitude of the response signals received on the sine and cosine channels.

Figure 6:
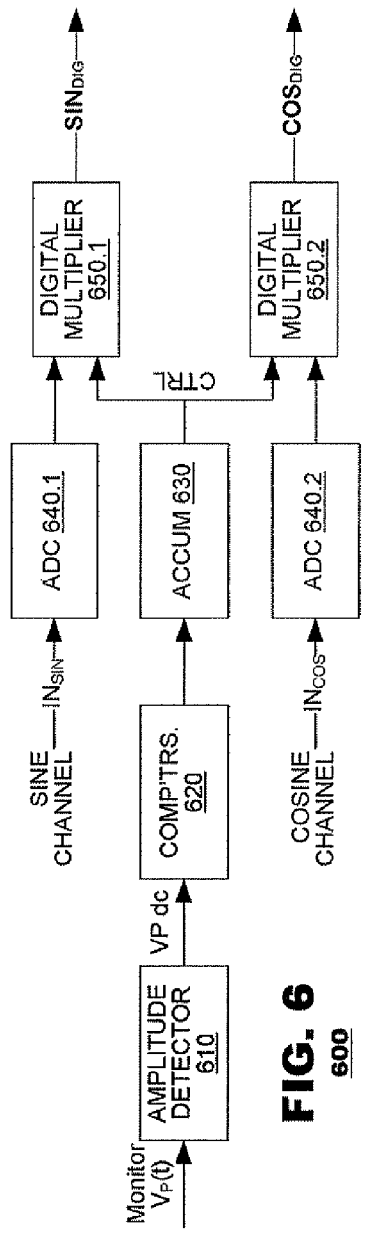
FIG. 6 illustrates an application of the gain control signal according to a further embodiment of the present invention.

FIG. 6 illustrates an application of the gain control signal according to a further embodiment of the present invention. In this embodiment, the gain control signal CTRL may provide control for a pair of digital multipliers provided along signal paths for the sine and cosine channels. FIG. 6 illustrates the amplitude detector 610, comparators 620 and accumulator 630 of prior embodiments. In the embodiment of FIG. 6, the sine and cosine channels may be input to respective ADCs 640.1, 640.2, which digitize the input signals. Respective digital multipliers 650.1, 650.2 may scale the outputs of the ADCs 640.1, 640.2 by a scaling factor determined by the CTRL signal. Thus, the digital multipliers 650.1, 650.2 may generate output signals $SIN_{DIG}$, $COS_{DIG}$ which have been scaled to overcome any mismatch between the RDC and the resolver.

FIG. 7 illustrates application of a control signal to processing systems at the input of the RDC, according to another embodiment of the present invention. FIG. 7 illustrates the amplitude detector 710, comparators 720 and accumulator 730 as discussed above for prior embodiments. In this embodiment, the output of the accumulator 730 may be applied directly as a gain control signal CTRL and, therefore, no separate gain conditioning circuit 340 (FIG. 3) is necessary. In the embodiment illustrated in FIG. 7, the input circuit systems may include respective multiplying digital to analog converters (MDACs) 740.1, 740.2 and ADCs 750.1, 750.2.

The MDACs 740.1, 740.2 may have inputs for a digital code and an analog reference voltage. For the sine channel, the input signal $IN_{SIN}$ may be coupled to the reference input of MDAC 740.1 and, for the cosine channel, the input signal $IN_{COS}$ may be coupled to the reference input of MDAC 740.2. Both MDACs 740.1, 740.2 may have code inputs coupled to the output of the accumulator 730. During operation, the MDACs 740.1, 740.2 may generate analog output signals that respectively represent sine channel voltage or cosine channel voltage multiplied by the gain control code from the accumulator 730. Thereafter, the ADCs 750.1, 750.2 may digitize the outputs of their corresponding MDACs 740.1, 740.2. In this manner, the gain controlled MDACs 740.1, 740.2 may tune the input sine and cosine channel signals to the range of the ADCs 750.1, 750.2.

In the embodiment illustrated in FIG. 7, the gain control signal CTRL is shown as derived directly from the gain value stored by the accumulator 730. Such an embodiment may cause the MDACs 740.1, 740.2 to scale the sine/cosine input channels linearly with the accumulated gain values. If desired, non-linear operation may be achieved by providing a look up table between the accumulator 730 and MDACs 740.1, 740.2. In such an embodiment, the gain value may be applied to the table (not shown) as an index and the gain control signal CTRL may be read therefrom. Such a table permits RDC designers to tailor characteristics of response the CTRL signal to changes in the gain value stored in the accumulator as desired.

FIG. 8 illustrates the gain control system of FIG. 7 as integrated into an RDC processing system 800. The RDC processing system may include a pair of MDACs 810.1, 810.2 and ADCs 820.1, 820.2 for respective sine and cosine input channels. As discussed, the analog channel signals may be input to respective MDACs 810.1, 810.2 as reference signals and a common digital code may be input to the MDACs 810.1, 810.2 from the gain control system. The ADCs 820.1, 820.2 may digitize the scaled input channel signals and generate digital output signals of M bits each. An RDC processing 830 core may calculate an angular position ($\Phi$) from the digitized ADC output. The $\Phi$ signal may be output from the RDC as position data or stored to a register for retrieval.

The RDC processing system 800 further may include a digital frequency synthesizer 840 that generates $\sin(\Phi t)$ and $\cos(\Phi t)$ signals from the $\Phi$ signal. Mixers 850.1, 850.2 may be provided to multiply the digitized channel signals ($Vp*\sin(\omega t)*\sin(\theta t)$, $Vp*\sin(\omega t)*\cos(\theta t)$) respectively with the synthesized $\sin(\Phi t)$ and $\cos(\Phi t)$ generated from the digital frequency synthesizer 840. Finally, an adder 850.3 may add the mixed signals to generate a monitor signal having the form as shown above in Eq. 1 above. As noted above, when $\Phi=\theta$, the monitor signal simplifies to Eq. 3.

The RDC processing system 800 may include a gain control system that includes an amplitude detector (shown as demodulator 840 and low pass filter 850), comparators 860, an index counter 870 and a look up table 880. The demodulator 840 and low pass filter 850 collectively derive an amplitude component Vp DC from the monitor signal. The comparators 860 may compare the amplitude component Vp DC to the high and low thresholds and the index counter 870 may increment, decrement or maintain an aggregate count values based on indications from the comparators 860. In the embodiment illustrated in FIG. 8, a look up table 880 is provided to convert the index count value to a digital gain setting, which may propagate back to the MDACs 810.1, 810.2.

Figure 9:
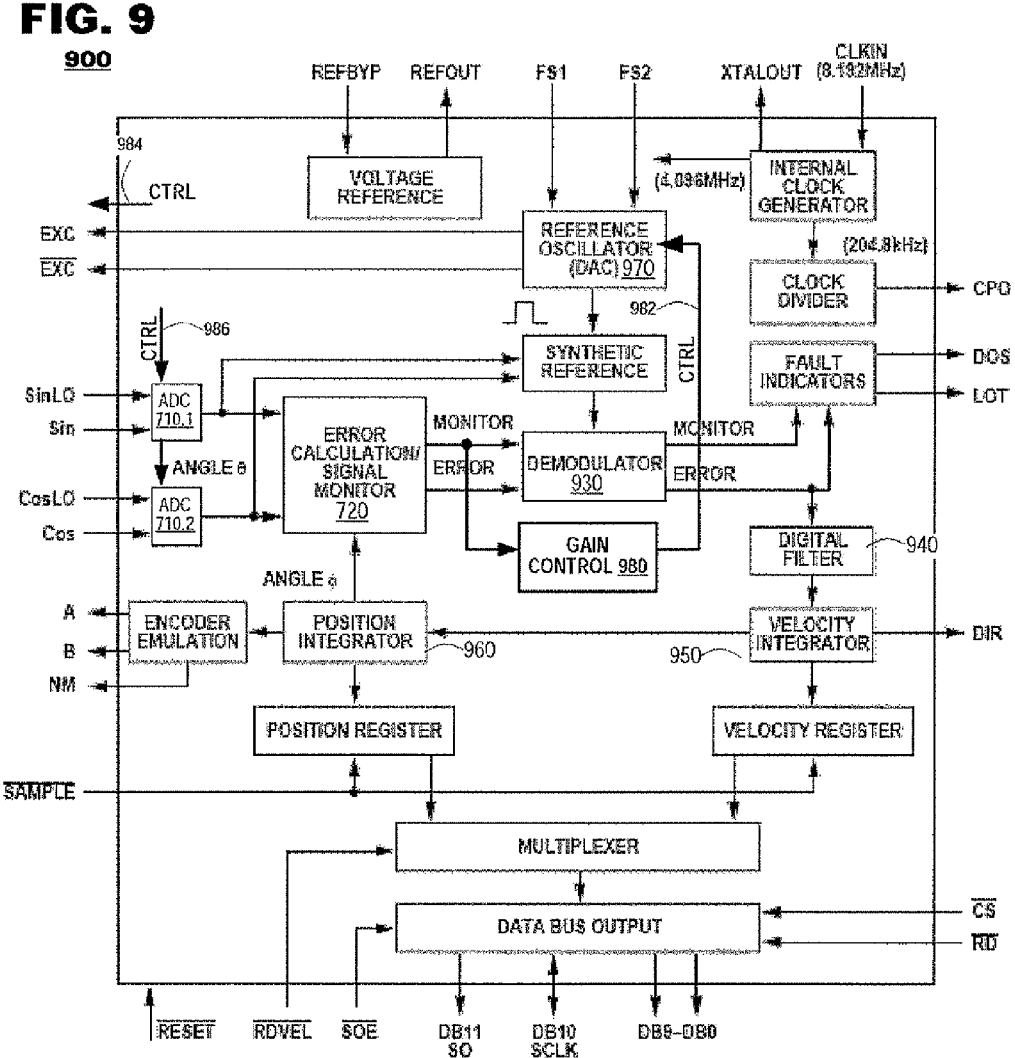
FIG. 9 illustrates an RDC architecture with integrated gain control according to an embodiment of the present invention.

FIG. 9 illustrates application of the gain control system to another RDC architecture 900. The architecture illustrated in FIG. 9 is based on an RDC product manufactured by Analog Devices, model AD2S1200. In this instance, the RDC 900 includes ADCs 910.1, 910.2, an error calculation/signal monitor unit 920, a demodulator 930, a digital filter 940, a velocity integrator 950 and a position integrator 960. The RDC 900 further includes a reference oscillator/DAC generator 970 to generate an excitation signal to the resolver primary (not shown). In this regard, the architecture of the RDC 900 is well known.

In an embodiment, the RDC 900 may include a gain control system 980 to generate control signals CTRL in response to a monitor signal. The architecture of the AD2S1200 is particularly convenient for such applications because the monitor signal is generated by the error calculation/signal monitor unit 920. Thus, the monitor signal may be used advantageously for the purposes described hereinabove.

The control signal may be output to the reference oscillator 970 to modulate amplitude of the excitation signal applied to the resolver primary (shown as CTRL line 982). Alternatively, the control signal may be applied to amplification circuits (not shown) that drive the resolver primary and may be output from the RDC as a separate control signal 984. Further, the control signal may be applied to sampling capacitor arrays (not shown) in the ADC 910.1, 910.2 via control line 986.

Resolvers find application in many applications to measure angular position of rotating elements. FIGS. 10-12 illustrate exemplary applications of resolvers in modern products. FIG. 10 illustrates a robotic system 1000 that includes a pair of movable arms. Each arm may include several joints that are comprised of rotating members R to provide multiple degrees of freedom. Resolvers may be provided on each of the rotating members R to track the arm's movement with respect to an object being operated upon by the system 1000. Similarly, FIG. 11 illustrates an automated sewing machine 1100 that includes a rotating axle (also denoted by R). The machine 1100 may include object handlers to move a piece of cloth in x, y directions along a base of the machine. A resolver may be provided on the axle R to measure its angular position, from which the position an orientation of a sewing needle may be derived. In such a manner, an automated control system may synchronize operation of the needle and movement of the cloth being operated on to automate stitching patterns, etc.

FIG. 12 illustrates application of resolvers to automobiles 1200 and, particularly, to hybrid electric vehicles (HEV). Resolvers may be provided in conjunction with rotors of such vehicles (also denoted R) to measure each wheel's angular position and velocity. From such measurements, computer control may derive the vehicle's speed.

The principles of the present invention find application with resolvers used in the environments of FIGS. 10-12. Again, the automated gain control techniques described herein are expected to lower TCO of resolver systems in general and provide product designers greater flexibility in selection of resolver products to be used with an RDC.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A gain control system to control signal mismatch between a resolver and a resolver-to-digital converter (RDC), comprising:
   an amplitude measuring circuit to detect an amplitude of resolver input signals received by the RDC from the resolver,
   one or more detection circuits each to detect the deviations of the input signal amplitude from a corresponding set point,
   a signal level estimator to respond to increase/decrease indications from the set point deviation detector, and
   a control signal generator to output a gain control signal based on signal level estimator output.

2. The gain control system of claim 1, wherein the amplitude measuring circuit receives a monitor signal having the form:

$$Vp*\text{Sin}(\omega t)*[\sin(\theta t)*\sin(\Phi t)+\cos(\theta t)*\cos(\Phi t)],$$

where Vp represents the amplitude to be detected, θt represents a frequency characteristic of the input resolver signals, and Φt represents a synthesized frequency signal, and
the amplitude measuring circuit comprises a demodulator and a filter in cascade.

3. The gain control system of claim 1, wherein the signal level estimator is a digital counter responsive to outputs from the set point deviation detector.

4. The gain control system of claim 1, wherein the control signal generator is a digital look up table indexed by an output of the signal level estimator.

5. The gain control system of claim 1, wherein the gain control signal is output to a pair of analog-to-digital converters (ADCs) that digitize the resolver input signals received by the RDC.

6. The gain control system of claim 5, wherein the control signal generator comprises a look up table storing switch settings for sampling capacitor arrays of the ADCs.

7. The gain control system of claim 5, wherein the ADCs include multiplying digital to analog converters (MDAC), each MDAC having a reference input for a respective input signal from the resolver and having a code input for the gain control signal.

8. The gain control system of claim 1, wherein the gain control signal is output to a pair of multipliers each receiving an output from an analog-to-digital converter (ADCs) that digitize a respective resolver input signal.

9. The gain control system of claim 1, wherein the gain control signal is output to an excitation generator that generates an excitation signal to the resolver.

10. The gain control system of claim 1, wherein the gain control system includes a pair of detection circuits to detect the deviations of the input signal amplitude from corresponding pair of set points.

11. A gain control system to control signal mismatch between a resolver and a resolver-to-digital converter (RDC), comprising:
    an amplitude detector to detect an amplitude of resolver input signals received by the RDC from the resolver,
    a pair of comparators, each comparing the detected amplitude to a respective one of a high and low threshold,
    a counter, responsive to outputs from the comparators, to increment or decrement a gain value count, and
    a control signal generator to output a gain control signal based on the gain value count.

12. The gain control system of claim 11, wherein the gain control signal is output to a pair of analog-to-digital converters (ADCs) that digitize the resolver input signals received by the RDC.

13. The gain control system of claim 12, wherein the control signal generator comprises a look up table storing switch settings for sampling capacitor arrays of the ADCs.

14. The gain control system of claim 12, wherein the ADCs include multiplying digital to analog converters (MDAC), each MDAC having a reference input for a respective input signal from the resolver and having a code input for the gain control signal.

15. The gain control system of claim 12, wherein the ADCs are sigma delta ADCs.

16. The gain control system of claim 12, wherein the ADCs are SAR ADCs.

17. The gain control system of claim 11, wherein the gain control signal is output to an excitation generator that generates an excitation signal to the resolver.

18. The gain control system of claim 11, wherein the gain control signal is output to a pair of multipliers each receiving an output from an analog-to-digital converter (ADCs) that digitize a respective resolver input signal.

19. A gain control method to control signal mismatch between a resolver and a resolver-to-digital converter (RDC) in a resolver system, comprising:
   generating a monitor signal from a pair of input signals from the resolver and a second pair of locally synthesized frequency signals,
   determining an amplitude of the input signals from the monitor signal,
   comparing the detected amplitude to a high threshold and to a low threshold,
   generating a gain control signal based on the comparisons, and
   outputting the gain control signal to a circuit of the resolver system.

20. The method of claim 19, wherein the gain control signal is output to a circuit that controls an excitation signal applied to a primary winding of the resolver.

21. The method of claim 19, wherein the gain control signal is output to an RDC input circuit that scales the input signals received from the resolver.

22. The method of claim 21, wherein the gain control signal controls configuration of a sampling capacitor array of a pair of analog-to-digital converters provided in respective signal paths of the input signals.

23. The method of claim 21, wherein the gain control signal controls operation of a multiplying digital to analog converter provided in respective signal paths of the input signals.

24. The method of claim 19, wherein the gain control signal is output to a pair of multipliers each receiving an output from an analog-to-digital converter (ADCs) that digitize a respective resolver input signal.

25. The method of claim 19, wherein the gain control signal is a digital control signal.

26. A gain control method to control signal mismatch between a resolver and a resolver-to-digital converter (RDC) in a resolver system, comprising:
   detecting an amplitude of resolver input signals received by the RDC from the resolver,
   comparing the detected amplitude to a high threshold and to a low threshold,
   when the detected amplitude exceeds the high threshold, decrementing a gain value count,
   when the detected amplitude is less than the low threshold, incrementing the gain value count,
   generating a gain control signal based on the gain value count, and
   outputting the gain control signal to a circuit of the resolver system.

27. The method of claim 26, wherein the gain control signal is output to a circuit that controls an excitation signal applied to a primary winding of the resolver.

28. The method of claim 26, wherein the gain control signal is output to an RDC input circuit that scales the input signals received from the resolver.

29. The method of claim 28, wherein the gain control signal controls configuration of a sampling capacitor array of a pair of analog-to-digital converters provided in respective signal paths of the input signals.

30. The method of claim 28, wherein the gain control signal controls operation of a multiplying digital to analog converter provided in respective signal paths of the input signals.

31. The method of claim 28, wherein the gain control signal is output to a pair of multipliers each receiving an output from an analog-to-digital converter (ADCs) that digitize a respective resolver input signal.

32. The method of claim 26, wherein the gain control signal is a digital control signal.

* * * * *